United States Patent [19]

Argiropoulos

[11] Patent Number: 5,771,736
[45] Date of Patent: Jun. 30, 1998

[54] APPARATUS AND METHOD FOR THE CUTTING AND BENDING OF SHEET MATERIAL SUCH AS METAL

[76] Inventor: John G. Argiropoulos, 3857 N. Tazewell, Arlington, Va. 22207

[21] Appl. No.: 841,777

[22] Filed: May 5, 1997

Related U.S. Application Data

[63] Continuation of Ser. No. 319,558, Oct. 7, 1994, abandoned.

[51] Int. Cl.⁶ .................................................. B21D 43/28
[52] U.S. Cl. ........................ 72/339; 72/405.01; 83/165
[58] Field of Search ............................. 72/294, 319, 339, 72/419, 428, 331, 337, 275, 330, 420, 405.01, 426; 83/165, 106

[56] References Cited

U.S. PATENT DOCUMENTS

| | | | |
|---|---|---|---|
| 550,381 | 11/1895 | Rand | 72/426 |
| 696,784 | 4/1902 | Yager | 72/294 |
| 864,349 | 8/1907 | Yager | 72/337 |
| 1,267,379 | 5/1918 | Cook | 29/563 |
| 1,559,835 | 11/1925 | Ziler | 72/330 |
| 1,584,998 | 5/1926 | Symons | 72/335 |
| 1,956,216 | 4/1934 | Booth | 72/426 |
| 2,178,461 | 10/1939 | Apprill | 72/405 |
| 2,297,948 | 10/1942 | Eisenhauer | 72/405 |
| 2,773,607 | 12/1956 | Locke | 414/930 X |
| 3,595,058 | 7/1971 | Beneke | 72/339 |
| 3,612,515 | 10/1971 | Bergson | 271/86 |
| 4,026,425 | 5/1977 | Gruodis | 414/299 |
| 4,162,733 | 7/1979 | Wiseman | 414/790.5 X |
| 4,660,469 | 4/1987 | Smith et al. | 100/85 |
| 5,062,195 | 11/1991 | Binder | 29/563 X |
| 5,099,981 | 3/1992 | Guzzoni | 29/563 X |

OTHER PUBLICATIONS

10M14 Shear Manual—Roper–Whitney Mechanical Shear, Model 10M14 Dated: Jan. 1990 35 pages.
Ras Metal Folding Machine, Model 67.30 Brochure Dated: None 11 pages.

*Primary Examiner*—Daniel C. Crane
*Attorney, Agent, or Firm*—Thomas E. Lynch

[57] ABSTRACT

Plural station equipment is provided for the making of articles of manufacture from sheet material such as sheet metal. The first work station performs a first operational step on the sheet material to form precise blanks, and the second station performs the finishing step on the blanks to produce the article of manufacture. The first station is located above the second station, and it is laterally offset from the second station. An inclined chute is provided between the output of the first station for allowing the precise blanks to slide by gravity to the input of the second station. Thus, the inclined chute automatically transfers the precise blanks from the first station to the second station without any manual intervention or the need of complex electromechanical transfer equipment. In a specific embodiment, the sheet material is sheet metal, and articles of manufacture are roof flashings.

8 Claims, 2 Drawing Sheets

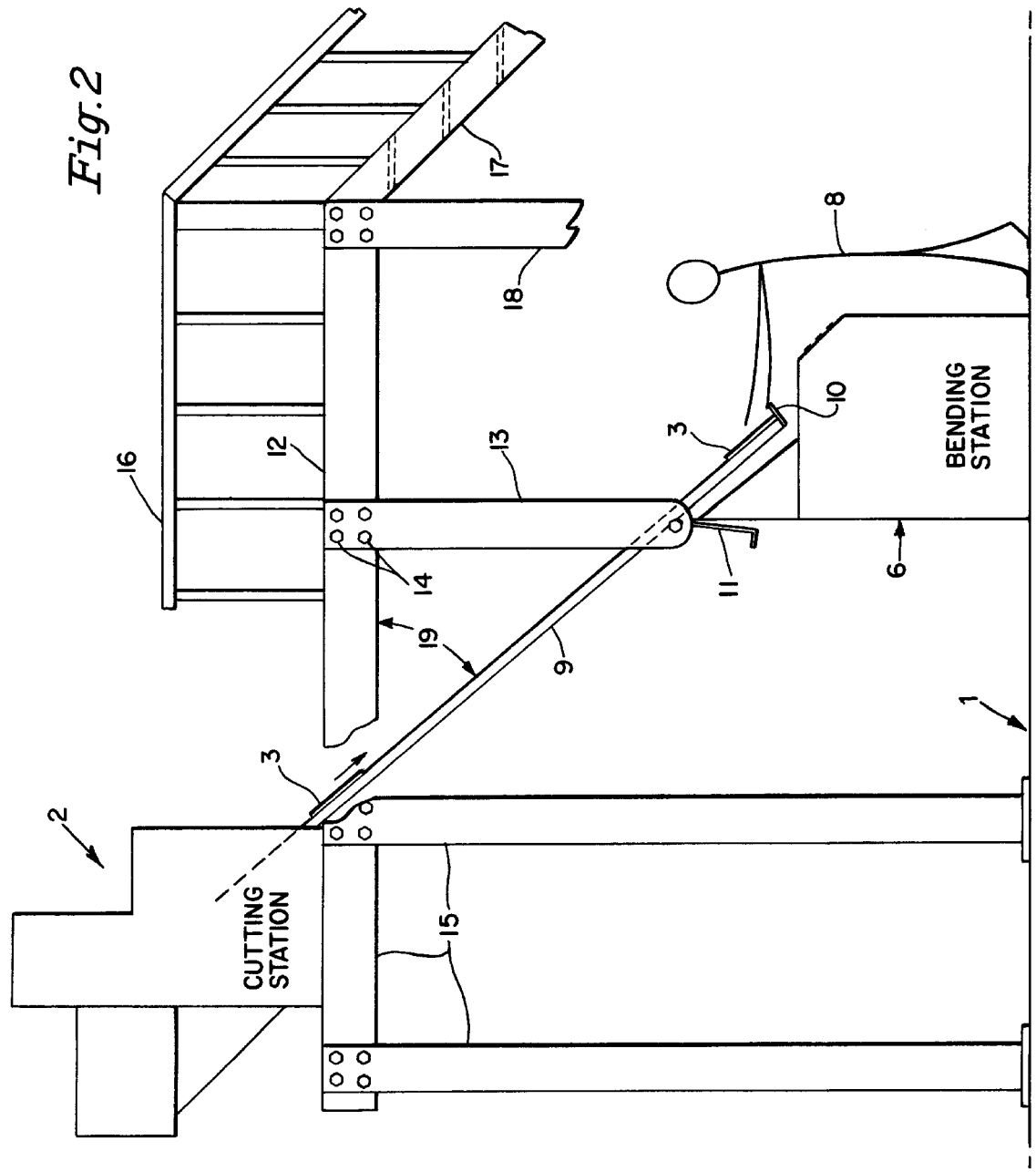

APPARATUS AND METHOD FOR THE CUTTING AND BENDING OF SHEET MATERIAL SUCH AS METAL

This application is a continuation of Ser. No. 08/319,558, filed Oct. 7, 1994, now abandoned.

Be it known that I, John G. Argiropoulos, a citizen of the United States, whose Post Office address is: 4741 N. Rock Spring Road, Arlington, Va. 22207, have invented a new, useful and unobvious apparatus and method for the cutting and bending or folding of sheet material such as sheet metal, as fully disclosed and described below.

BACKGROUND OF THE INVENTION

1. Field of Invention

The present invention pertains generally to a method and apparatus which facilitates the sequential operation of a plural station cutting and bending or folding apparatus, more particularly, to the cutting and bending or folding of sheet metal, whereby prior art manual operations are eliminated which improves the efficiency of these operations and reduces the cost of the end product. This invention includes a plural station apparatus and method, wherein blank sections of stock sheet material are first fed into the cutting station of a plural station apparatus. The cutting station can be set to cut the sheet material to the appropriate dimensions to produce a precise blank which is then automatically fed to a programmed bending or folding station which bends or folds the blank to produce the finished product. By automatically forwarding the cut blanks to the bending or folding station, the manual step of carrying the blanks from the cutting station to the bending or folding station is eliminated.

2. Discussion of the Background of the Invention

The uses of plural station cutting and bending or folding operations on sheet materials have proliferated over the years. Such cutting and bending or folding operations are useful in forming a variety of products such as cardboard to form boxes; paper to form books, folders, brochures, etc.; plastic products to form containers, decorative items, etc.; and sheet metal products to form decorative and functional architectural elements such as roof flashings.

The prior art falls generally into two broad categories: i.e., a simple manual, two-station system, and the much more complex, automatic systems. A simple manual system includes separate cutting and bending or folding stations which are stand-alone machines that are physically separated from each other. In such a system, the stock sheet material is cut in a first machine to form a blank, and the cut blank is then manually hand carried from the cutting station to a bending or folding station for the final processing. The disadvantage of such simple systems is that they are slow and manually intensive which reduces their efficiency of operation, and thus, the ultimate cost of the finished products.

On the other hand, the complex automatic systems usually include electromechanical transfer devices such as numerically controlled synchronized conveyers or transfer tables. These devices, while very fast, are often difficult to initially program for a specific product, and because of their high initial cost, are not efficient for small production runs. Therefore, neither the simple stand-alone systems, nor the complex automatic transfer systems, are efficient for the average small fabricating shop with moderate sized production runs.

SUMMARY OF THE INVENTION

It is an object of the present invention to provide a method and apparatus for facilitating the transfer of the cut, sheet material blanks from the cutting station to the bending or folding station while eliminating the manual transfer step required by the simple prior art systems, and which performs this transfer operation in a manner which does not require the electromechanical transfer tables of the complex prior art systems.

It is a further object of this invention wherein the cut blanks are transferred in a manner which does not require the gripping of the blanks in any manner, i.e., manual or mechanical, such as required in both the simple manual systems and the complex electromechanical transfer systems. Thus, the cut blanks cannot be harmed, such as by being bent or dropped in the manual systems, or by scratches or other surface blemishes caused by the mechanical gripping in the complex electromechanical systems.

Finally, it is an object of this invention to automatically stack the cut blanks at the input of the bending or folding station whereby they are readily removed from the stack for insertion into the bending or folding station.

These and other objects are achieved by raising the cutting station above, and offset from, the bending or folding station, and by including a gravity fed chute between the output of the cutting station to the input of the bending or folding station. The result is an efficient and effective transferring of the cut blanks to the bending or folding station, whereby the step of manually transferring of the blanks is eliminated, whereby complex electromechanical transfer tables are not required, whereby the cut blanks are not harmed in any manner, and whereby the cut blanks are neatly stacked, at the input of the bending or folding station.

BRIEF DESCRIPTION OF THE DRAWINGS

FIG. 2 is a side view of the present invention wherein the difference in height between the two stations is depicted, and which shows a gravity fed chute for automatically transferring the cut blanks between the cutting and the bending or folding stations.

DESCRIPTION OF THE PREFERRED EMBODIMENT

Figure 1:
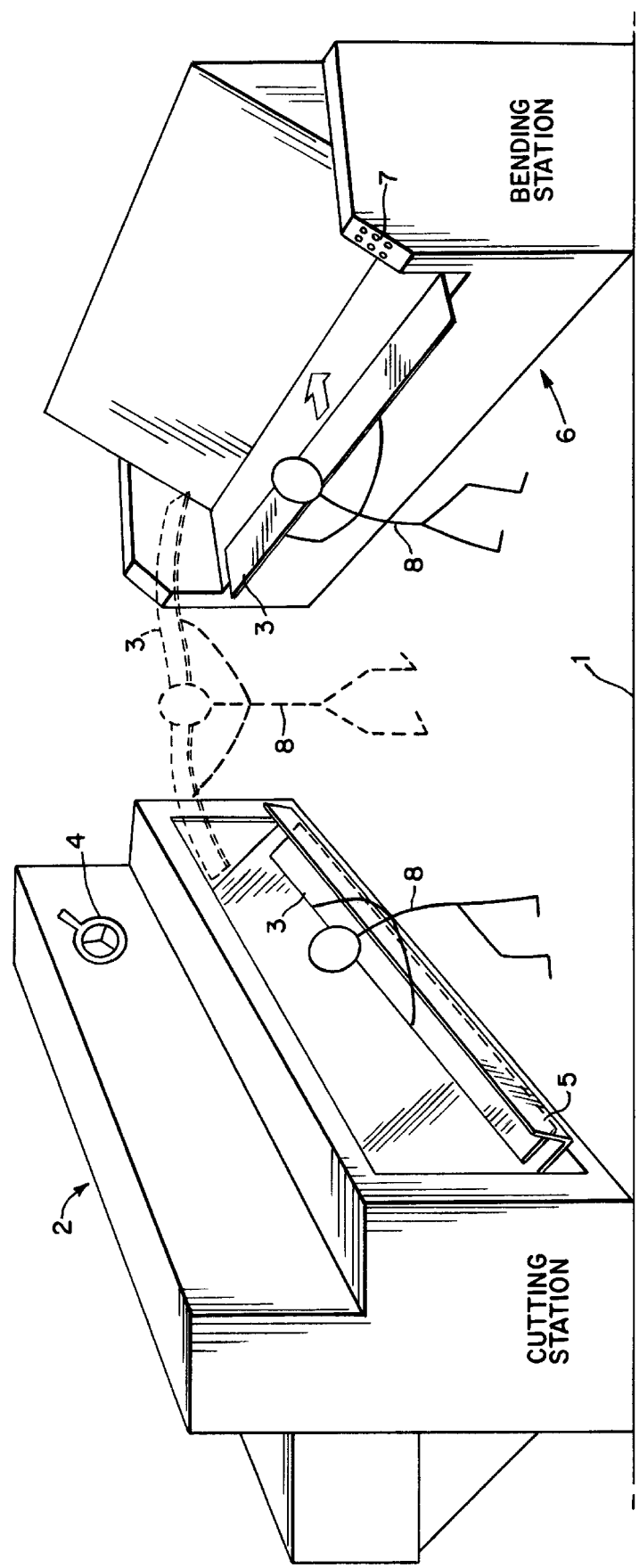
FIG. 1 is a view of a simple manual prior art embodiment which requires an operator, or operators, to manually transfer the cut blanks between the two stations.

In the following, the present invention will be described in detail in conjunction with the exemplary embodiment thereof with reference to the accompanying drawings. Also in the drawings, those elements of the prior art and those elements of the invention which are in common, will be referred to by the same numbers.

FIG. 1 is a side view of a simple prior art system. In this Figure, reference numeral 1 denotes the shop floor upon which the cutting and bending or folding stations are placed. Numeral 2 depicts the cutting station. The cutting station 2 is shown placed to the left of the bending or folding station which is represented by the numeral 6. The cutting station 2 can be any representative commercially available cutting machine such as the Roper-Whitney Mechanical Shear, Model 10M14. Such machines typically accept the blank sheet materials, cut the blank sheet materials by the positioning of mechanical shears, and then exit the precisely cut blanks as indicated by numeral 3. The cut blanks 3 are exited from the cutting machine via the exit trough 5 near the floor of the shop. The cut blanks 3 can be quite long in the lateral direction, often as long as eight to ten feet in length. The precise dimensions of the cut blanks are set into the machine by a programming wheel as indicated by the numeral 4.

The specifics of the cutting station 2 are not disclosed in detail herein since they are not pertinent to the claimed invention. The programming of the cutting station can be as simple or as complicated as desired by the user of the system, and as dictated by the technical capabilities of the particular cutting machine used.

The bending or folding station 6 in FIG. 1 is also depicted as placed on the shop floor 1 to the right of the cutting station 2. The bending or folding station 6 can be any convenient commercially available bending or folding machine such as the RAS Folding Machine, Model 67.30. Such machines typically accept the precisely cut blanks 3, and bend or fold them to some programmed shape by a plurality of preprogrammed bending or folding brakes, not shown. Since the specifics of the bending or folding machine are also not necessary to the understanding of the claimed invention, their details are not disclosed herein. The bending or folding operation is programmed by the touch pad 7 on the right hand side panel of the machine. The programming of the bending or folding station 6 can be as simple or as complicated as desired by the user of the system, and as dictated by the technical capabilities of the particular bending or folding machine chosen.

Finally, as depicted by an operator indicated by the numeral 8, the cut blanks 3 of FIG. 1 are transferred from the cutting machine 2 to the bending or folding machine 6 by manually lifting them from the floor level exit trough 5, and transferring each blank 3 to the bending or folding machine 6. Not only is such a process slow and inefficient, but it is also possible for the operator to drop the cut blank 3, possibly damaging it, which increases the wastage of the system. More importantly, when the cut blanks 3 are very wide as indicated above, they are quite flexible as indicated by the dotted line embodiment of FIG. 1. Thus, they are subject to bending or folding which either damages them or makes them difficult to insert into the bending or folding station. Therefore, in the past, the transfer between stations often required two men, or at the very least, required an intermediate table (not shown) to facilitate the transfer.

Although the bending or folding station 6 is shown to the right of the cutting station 2, it is clear that their relative positions could be transposed. Also, they could be placed side-by-side, they could be placed at 90° degrees, or they could be placed at another position as dictated by the space available on the shop floor. In any case, any placement in the prior art would still require the manual lifting and transfer of the cut blanks 3 from the cutting station to the bending or folding station with all of the incidental problems listed above.

An example of a complex electromechanical transfer mechanism is not depicted in the drawings because its description would unnecessarily clutter the description of the invention. However, an example of such a complex system is disclosed in the U.S. Pat. No. 5,099,981 to Guzzoni, which issued on Mar. 31, 1992. Such a system, while clearly adaptable to a plural station cutting and bending or folding operation, would obviously be impractical for all but the largest and expensive of industrial installations.

FIG. 2 is directed to the specific embodiment of the invention. As noted above, those elements in common with the prior art of FIG. 1 are given the same numerical designation. The shop floor is again indicated by the numeral 1. Mounted on the floor 1 is a raised platform 12 which supports the cutting machine 2. If desired, the cutting machine 2 can be the same cutting machine 2 as that depicted in FIG. 1. The raised platform 12 is supported on the floor 1 by the posts and superstructure indicated generally by the numerical elements 15. The cutting machine exit trough 5 has been modified from the FIG. 1 embodiment by extending it several feet, and by sloping it to form a gravity exit chute 9. The raised platform 12 is shown cut-away so that the extension of the exit chute 9 from the cutting station 2 is more clearly shown. The preferred angle of slope 19 is approximately 30 degrees, although any other convenient angle which is sufficient to allow the cut blanks 3 to slide between the cutting station and the bending or folding station, is also contemplated. Too steep an angle 19, however, may cause the cut blanks 3 to fall rather than slide along the exit chute 9 which could be undesirable.

The exit chute 9 is terminated with an end flange 10 which receives the cut blanks 3 as they are exited from the cutting machine 2. The cut blanks 3 are stacked against the end flange 10 in such a way that they are easily available to the operator 8 as indicated in FIG. 2. The cut blanks 3 in FIG. 2 are depicted with an exaggerated thickness whereby they are more clearly shown with respect to the exit chute 9. The exit chute 9 is stiffened widthwise into FIG. 2 near the end flange 10 by a brace 11 which extends along the width of the exit chute 9. As indicated above, since the cut blanks 3 can be quite wide (8 to 10 ft.), the width of the chute 9 must be sufficient to accommodate such widths. The exit chute 9 is also supported in its sloped position by the support arms 13 which are attached at either side of the chute, and which are attached at their upper ends by elements 14 to the superstructure 15 of the raised platform 12.

Around the raised platform 12 is a railing 16, and at one end of the raised platform is a stairway 17 which extends to the shop floor 1 to allow access between the shop floor 1 and the cutting station 2 resting on the raised platform 12. The railing 16 also extends downward from the raised platform 12 along the stairway 17 to provide support for an operator when he gains access to the raised platform 12. The extension of the stairway 17 to the shop floor 1 is not shown since it would unnecessarily clutter the Figure.

The bending or folding station 6, which may be the same machine as the bending or folding machine 6 depicted in FIG. 1, is placed on the shop floor 1, to the right of and below the cutting station as depicted in the FIG. 2. Of course, the arrangement of the stations can be reversed, as in a mirror image, just as long as the cutting station is above the bending or folding station.

One of the raised platform support posts in FIG. 2 forming part of the support structure 15 is shown cut-away at numeral 18 to show the operator 8 standing on the shop floor in front of the bending or folding station 6. The cut blanks 3 which exit from the cutting station 2 slide down the exit chute 9 to the flange 10 so that the operator can easily remove them for entry into the bending or folding station 6. The exit chute 9 thus provides an automatic transfer between the two stations without (1) requiring the step of manually transferring the cut blanks 3 in the simple prior art of FIG. 1, or (2) the expensive electromechanical transfer mechanisms of the complex prior art systems. The result is an elegant solution to the problems of the prior art as outlined above.

Without further analysis, the foregoing so fully reveals the gist of the present invention that others can, by applying current knowledge, readily adapt it for various applications without omitting features that, from the standpoint of the prior art fairly constitute essential characteristics of the generic and specific aspects of my contribution to the art, and therefore, such adaptations should and are intended to be comprehended within the meaning and range of equivalence of the appended claims.

I claim:

1. A two station apparatus for the multiple processing of relatively wide, thin, flexible sheet material of such wide, thin, and flexible nature that it will visibly, elastically bend of its own weight when supported only by its ends, to form articles of manufacture comprising:
   a. A first elevated station supported at a first elevated level which receives said relatively wide, thin, flexible sheet material, performs a first cutting operation thereon, and exits by the weight of said relatively wide, thin, flexible sheet material, a plurality of relatively wide, thin, flexible, and precisely cut blanks therefrom all having the same physical consecutive orientation, said relatively wide, thin, flexible, and precisely cut blanks also being of such relatively wide, thin, and flexible nature that they will visibly and elastically bend of their own weight when supported only by their widest ends;
   b. A second station supported at a second lower level from said first elevated level and offset laterally from said first elevated station which receives said relatively wide, thin, flexible, and precisely cut blanks all having the same physical consecutive orientation exited from said first elevated station, and performs a bending or folding operation thereon to form said articles of manufacture;
   c. A massive superstructure which forms and supports said elevated level at a level vertically displaced upwardly from said second lower level;
   d. A single inclined chute between said first elevated station and said second station which receives said relatively wide, thin, flexible, and precisely cut blanks all having the same physical consecutive orientation exited from said first elevated station, and automatically transfers them by sliding them to the input of said second station;
   e. Said single inclined chute being formed without any manual or mechanical intervention such as stops, momentary arresting means, or transfer tables at any point between said first elevated station and said input of said second station, and wherein said single inclined chute transfers said relatively wide, thin, flexible, and precisely cut blanks all having the same physical consecutive orientation to the input of said second station solely by gravity; and
   f. A single fixed upstanding flange at the input of said second station, wherein said plurality of said relatively wide, thin, flexible, and precisely cut blanks all having the same physical consecutive orientation traveling down said single inclined chute are neatly stacked against said single fixed upstanding flange at the input of said second station wherein said bending or folding operation is subsequently performed thereon in said second station to form said articles of manufacture.

2. An apparatus as recited by claim 1 wherein said relatively wide, thin, flexible sheet material is sheet metal and said articles of manufacture are roof flashings.

3. a. An apparatus as recited by claim 1 wherein said first elevated station comprises a cutting machine supported at said first elevated level by said massive superstructure, and said second station comprises a bending or folding machine at said second lower level, and
   b. A stairway between said first elevated level and said second lower level to facilitate the movement of an operator between said cutting machine and said bending or folding machine, and vice-versa.

4. A method for forming articles of manufacture from relatively wide, thin, and flexible sheet material comprising:
   a. Providing said relatively wide, thin, and flexible sheet material which is of such wide, thin, and flexible nature that it visibly and elastically bends or folds at its middle of its own weight when supported at both ends;
   b. Providing a first elevated processing station at a first elevated level for receiving from an operator said relatively wide, thin, and flexible sheet material and forming a plurality of relatively wide, thin, flexible and precisely cut blanks therefrom all having the same physical consecutive orientation by a cutting operation, said relatively wide, thin, flexible, and precisely cut blanks also being of such wide, thin, and flexible nature that they visibly and elastically bend at their middle due to their own weight when supported at both ends;
   c. Providing a second processing station which is placed at a second lower level and which is offset laterally from said first elevated level which accepts said relatively wide, thin, flexible, and precisely cut blanks all having the same physical consecutive orientation and forms said articles of manufacture by bending or folding said relatively wide, thin, flexible, and precisely cut blanks;
   d. Providing a massive supporting superstructure capable of supporting said operator for forming said first elevated level for said first elevated processing station which is vertically displaced from said second lower level and said second processing station;
   e. Providing a single inclined chute between said first processing station and said second processing station whereby said relatively wide, thin, flexible, and precisely cut blanks all of the same physical consecutive orientation are automatically transferred solely by gravity, without any intermediate manual or mechanical intervention such as mechanical stops, momentary arresting devices, or transfer tables from said first elevated processing station to said second processing station;
   f. Providing a single fixed upright flange at the very end of said single inclined chute at the input of said second processing station, said single fixed upright flange allowing said plurality of relatively wide, thin, flexible, and precisely cut blanks all of the same physical consecutive orientation to neatly stack at the input of said second processing station whereby said operator feeds said relatively wide, thin, flexible, and precisely cut blanks into said second processing station without a manual transfer between said first and said second processing stations.

5. The method of claim 4 wherein said relatively wide, thin, flexible sheet material is sheet metal and said articles of manufacture are roof flashings.

6. The method of claim 4 wherein said first elevated station is a cutting machine provided at said first elevated level and said second station is a bending or folding machine provided at said second lower level, and wherein a stairway is provided between said first elevated level and said second lower level, whereby said operator can move between said first processing station and said second processing station, and vice versa, in the performance of this method.

7. A two station apparatus for the processing of relatively wide, thin, and flexible sheet material of such wide, thin, and flexible nature that it will visibly, elastically bend of its own weight when supported only by its ends to form articles of manufacture comprising;

a. A first elevated station supported at a first elevated level which receives said relatively wide, thin, and flexible sheet material; performs a first cutting operation thereon; and exits; by the weight of said relatively wide, thin, and flexible sheet material; relatively wide, thin, flexible, and precisely cut blanks all of the same physical consecutive orientation therefrom; said relatively wide, thin, flexible, and precisely cut blanks also being of such relatively wide, thin, and flexible nature that they will visibly and elastically bend of their own weight when supported only by their widest ends;

b. A second station supported at a second lower level and offset laterally from said first elevated station, which receives said relatively wide, thin, flexible, and precisely cut blanks all of the same physical consecutive orientation exited from said first elevated station and performs a bending or folding operation thereon to form said articles of manufacture;

c. A massive superstructure capable of supporting an operator or operators of said two station apparatus, which forms and provides support for said first elevated level which is vertically offset from said second lower level;

d. A single inclined chute between said first elevated station and said second station which receives said relatively wide, thin, flexible, and precisely cut blanks exited from said first elevated station, and automatically transfers them solely by gravity to the input of said second station;

e. A single fixed upstanding flange at the end of said single inclined chute at the input of said second station, wherein said relatively wide, thin, flexible, and precisely cut blanks all of the same physical consecutive orientation traveling down said single inclined chute are stopped by said single fixed upstanding flange at the input of said second station, wherein said bending or folding operation is subsequently performed thereon in said second station to form said articles of manufacture.

8. An apparatus as recited in claim 7 wherein:

a. Said first elevated station comprises a cutting machine at said first elevated level supported by said massive superstructure, and said second station comprises a bending or folding machine at said second lower level, and b. A stairway between said first elevated level and said second lower level whereby said operator or operators can move from said first elevated level to said second lower level, and vice versa.

* * * * *